Aug. 7, 1928.

G. W. SMITH 1,679,689

PNEUMATIC HAMMER

Filed March 19, 1925

INVENTOR
G. W. Smith

ATTORNEY

Aug. 7, 1928.

G. W. SMITH 1,679,689

PNEUMATIC HAMMER

Filed March 19, 1925  3 Sheets-Sheet 3

WITNESSES
L. Goodman
E. N. Lovewell

INVENTOR
G. W. Smith

BY

ATTORNEY

Patented Aug. 7, 1928.

1,679,689

UNITED STATES PATENT OFFICE.

GEORGE WALTER SMITH, OF OTTUMWA, IOWA, ASSIGNOR TO HARDSOCG WONDER DRILL COMPANY, OF OTTUMWA, IOWA, A CORPORATION OF IOWA.

PNEUMATIC HAMMER.

Application filed March 19, 1925. Serial No. 16,690.

This invention relates to pneumatic hammers adapted to be operated by compressed air of the type known as semivalveless, wherein the passage of the air is controlled by the movement of a piston and a single valve cooperating therewith.

The general object of the invention is to provide a tool of this type in which the valve is actuated more quickly and positively than is the case with tools as heretofore constructed, this being accomplished by bringing the live or unexpanded air into direct contact with the valve to open and close the same, thus obtaining better results with a smaller consumption of compressed air.

The invention consists further in certain details of construction and combinations of elements, the advantages of which will be more particularly explained in connection with the accompanying drawings illustrating the invention in its preferred form.

In the drawings:

Figure 4 is a transverse section taken on the line 4—4 of Figure 1.

Figure 5 is a transverse section taken on the line 5—5 of Figure 1.

Figure 6 is a transverse section taken on the line 6—6 of Figure 2.

Figure 7 is a section through the valve cage taken substantially on the line 7—7 of Figure 6.

Figure 3:
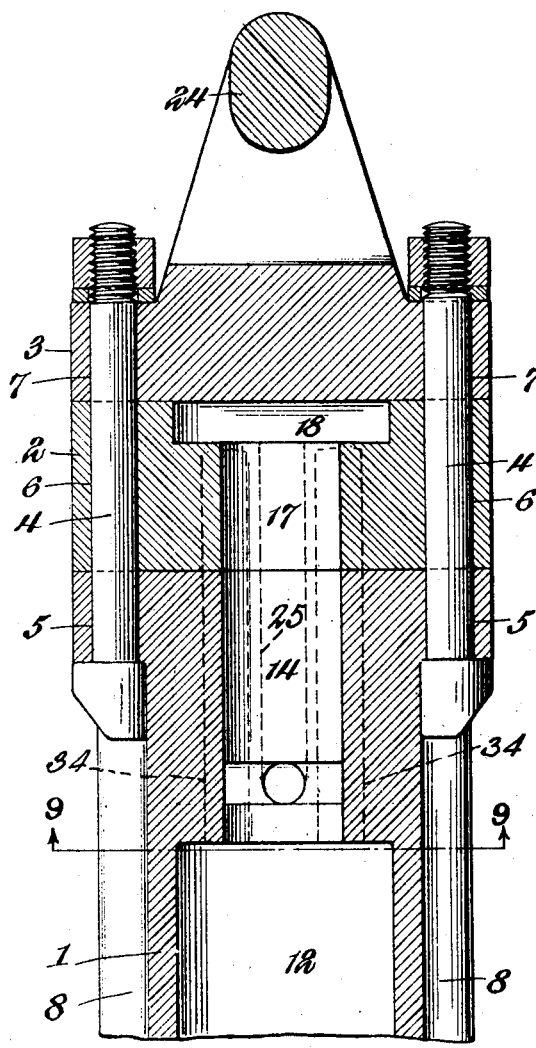
Figure 3 is an enlarged longitudinal section through the rear portion of the tool, the section being taken substantially as indicated by the line 3—3 on Figure 2.
Figure 8:
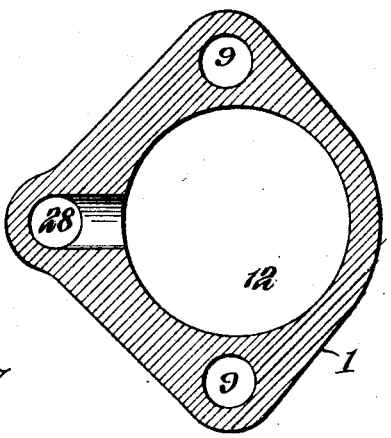
Figure 8 is a transverse section taken on the line 8—8 of Figure 1.
Figure 9:
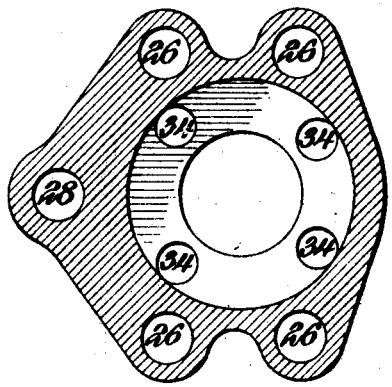
Figure 9 is a transverse section taken on the line 9—9 of Figure 3.

Referring in detail to the drawings, the tool comprises a cylinder having a main body portion 1, a rearward portion 2 containing the valve and constant pressure chamber, and a rear head 3. For convenience in machining, the sections 1, 2 and 3 are made separately and afterward secured in assembled relation by means of bolts 4, shown in Figure 3, which extend through holes 5, 6 and 7 in the respective sections 1, 2 and 3, grooves 8 being formed longitudinally of the section 1 to provide a clearance for the bolt heads when assembling. The lower or forward end of the main body portion 1 is also provided with holes 9 in alinement with the grooves 8 for receiving bolts, which secure the lower head 10 and the drill holder 11.

The lower or front portion of the section 1 is bored to provide a comparatively large cylinder portion 12 for receiving the head 13 of the piston, and the upper or rear portion of the section 1 is bored to provide a smaller cylinder portion 14 forming an extension of the larger cylinder portion 12, and receiving the shank 15 of the piston. The head 13 and shank 15 of the piston are connected by a neck 16, which is of smaller diameter than either the shank or head.

The section 2 has a central bore 17 forming a continuation of the cylinder portion 14, and communicating at its rear or upper end with a constant pressure chamber 18 to which compressed air is supplied through a passageway 19, having at its inlet end a socket 20 adapted to be connected to the compressed air supply. The passage of the compressed air through the passageway 19 is controlled by means of a valve 21, which is normally urged to closed position by a spring 22, and may be opened by means of a lever 23 located in the handle 24, which is secured to the head 3. The constant pressure chamber 18 communicates through a port or passageway 25 with the lower part of the cylinder portion 14.

The larger cylinder portion 12 is provided with one or more exhaust ports or passageways 26, and compressed air is supplied to the lower end of the larger cylinder portion 12 at the proper time by means of a passageway or port 27 leading from the constant pressure chamber 18, and a passageway 28 opening into the lower end of the cylinder. The passage of the air through the port 27 and passageway 28 is controlled by means of a valve 29 mounted for reciprocation in a valve cage 30, and having an enlarged head 31. The valve is opened at the proper time by live air introduced underneath the head 31 by means of a duct 32 leading from the lower part of the smaller cylindrical portion 14, and is closed at the proper time by means of live air introduced into the chamber 30, above the head 31, through a duct 33 leading from the upper part of the larger cylindrical portion 12.

Figure 1:
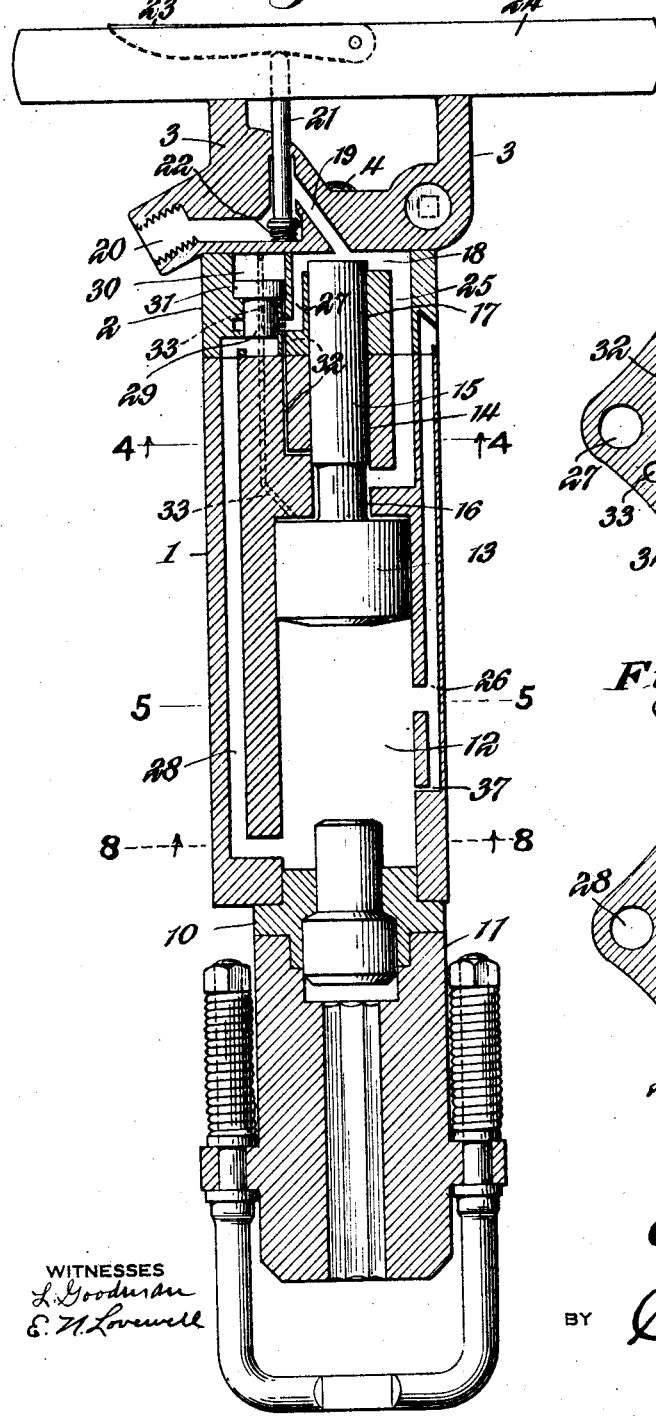
Figure 1 is a longitudinal section showing the plunger in its rearward or retracted position.
Figure 2:
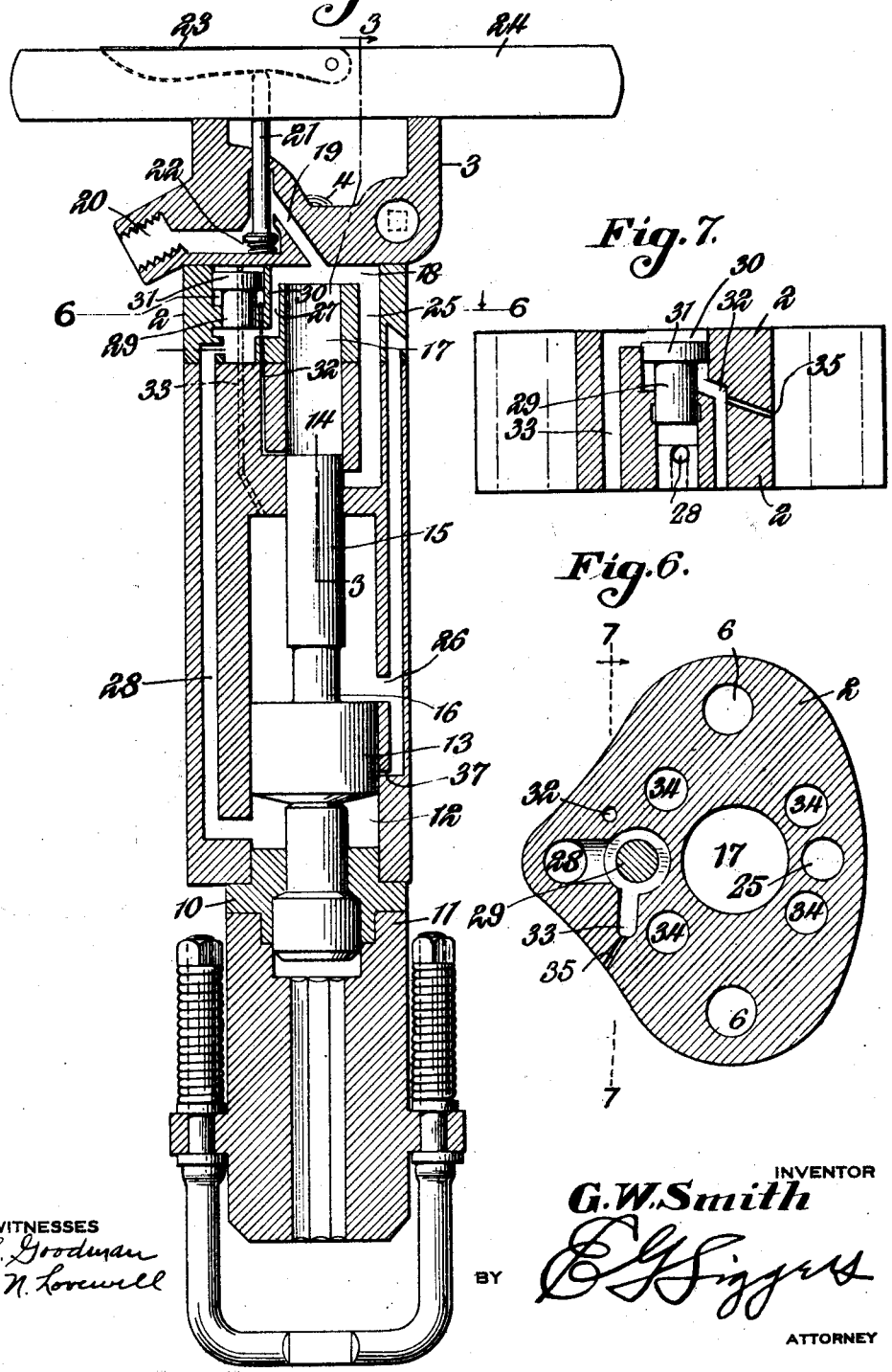
Figure 2 is a similar view showing the plunger in its forward position.

In the operation of the tool, when the parts are in the position shown in Figure 1, the compressed air in the constant pressure chamber 18 is in contact with the upper end of the shank 15, and also enters through the port 25 and around the reduced neck portion 16 into contact with the upper face of the piston head 13. The valve 29 is now closed, and as the piston is forced downwardly, the air in the lower part of the larger cylinder portion 12 is exhausted through the ports 26. As the piston reaches the forward end of its stroke, as shown in Figure 2, the duct 32 is uncovered by the upper end of the shank 15, and live air enters the valve cage underneath the head 31, and immediately opens the valve. The compressed air, which previously acted on the upper face of the valve 20, has at this time been vented through the duct 33, the large cylinder portion 12 and the ports 26. The compressed air now enters through the port 27 and passageway 28 into the lower end of the larger cylinder portion 12 underneath the piston head 13 and raises the same, since the pressure on the end of the head 13 is much greater than the pressure on the comparatively small end of the shank 15. Meanwhile the compressed air within the upper part of the larger cylinder portion 12 has been vented through the ports 26. As the piston head 13 rises and closes the ports 26, the small amount of air at atmospheric pressure, which is trapped in the upper part of the larger cylinder portion 12, is compressed into pockets 34 extending upwardly from the upper end of said larger cylinder portion and terminating near the upper part of the section 2, as indicated by dotted lines in Figure 3. This permits the piston, upon its rearward stroke, to reach the extreme end of the larger cylinder portion 12, and at the same time cushions the rearward stroke of the piston. As the piston shank 15, upon its rearward stroke, uncovers the port 25, live air is admitted to the upper part of the larger cylinder portion 12 and through the duct 33 to the chamber 30 above the valve head 31 and closes the valve. During the rearward movement of the piston head 13, it uncovers the exhaust ports 26 to release the compressed air from the lower end of the larger cylinder portion 12. At the time that the port 26 is uncovered, however, the piston has acquired sufficient momentum to carry it to the inner end of its stroke.

At the time when live air is introduced through the duct 33 to the chamber 30 to close the valve, the inner end of the duct 32 is closed by the shank 15 of the piston. The small amount of air beneath the valve head 31, however, is released through a bleed hole 35 extending from the duct 32 through the wall of the section 2, as shown in Figure 7. This bleed hole 35, however, is quite small compared with the size of the duct 32, Figures 6 and 7, so that it does not interfere with the immediate and positive opening of the valve by the incoming live air, at the conclusion of the forward stroke.

It will be noted that each of the exhaust ports 26 is comparatively large so that the used air, at the end of each stroke, may be immediately vented. There is also a small port 37 near the bottom of the cylinder, which connects with one of the exhaust ports 26, and permits the escape of the small amount of air remaining in the lower part of the larger cylinder portion 12 as the plunger completes its forward stroke, thereby preventing the formation of an air cushion which would tend to weaken the force of the blow. The duct 33 connecting the upper part of the valve chamber with the upper part of the cylinder portion 12 insures a downward pressure on the valve during substantially the entire downward stroke, thus overcoming any tendency for the valve to open prematurely under the influence of any back pressure which may be exerted through the passageway 28. The several ports and ducts are so arranged that nothing but live air actuates the valve, thereby resulting in a positive and quickly responsive valve action. This results in a quick and positive action of the plunger or hammer, and cuts down very materially the consumption of compressed air, and the consequent expense of operation.

While I have shown and described specifically the construction of the invention in its preferred form it is apparent that numerous modifications may be made in the construction and arrangement of the various parts without any material departure from the salient features of the invention. It is my purpose, therefore, to include all such modifications within the scope of the appended claims.

What is claimed is:

1. In a pneumatic hammer, a cylinder having a forward portion of comparatively large diameter and a rearward portion of comparatively small diameter, a piston having a head sliding in the larger forward portion of the cylinder, a shank sliding in the smaller rearward portion of the cylinder, and a neck connecting said head and shank and having a diameter less than either, means for constantly admitting fluid under pressure to the rear end of the rearward portion of the cylinder, means for intermittently admitting said fluid to the rearward end of the larger forward portion of the cylinder, a passage leading from the constant pressure end of the cylinder to the opposite end and opening into the larger forward portion of the cylinder, a valve for controlling said passage, a valve chest for said valve, a port leading from the smaller portion of the cylinder to one end of the valve chest but independent of said passage and uncovered by the shank of the piston toward the end of its forward stroke to admit fluid under pressure to open said valve, another port leading from the larger forward portion of the cylinder to the other end of the valve chest and serving to admit fluid to close said valve toward the conclusion of the rearward stroke, a bleed hole leading from the first mentioned port and serving to release the fluid from beneath the valve head while the valve is being closed, and an exhaust port leading from the larger forward end of the cylinder and controlled by the head of the piston.

2. In a pneumatic hammer, a cylinder having a forward portion of comparatively large diameter and a rearward portion of comparatively small diameter, a piston having a head sliding in the larger portion of the cylinder and a shank sliding in the smaller portion thereof, means for intermittently admitting compressed air to the rearward end of the larger portion of said cylinder, a passage for admitting compressed air to the forward end of said larger portion of the cylinder, a valve for controlling said passage, a valve chest for said valve, a port leading from the smaller portion of the cylinder to one end of the valve chest but independent of said passage and uncovered by the shank of the piston toward the end of its forward stroke to admit live air to open said valve, another port leading from the larger forward portion of the cylinder to the other end of the valve and uncovered by the head of the piston during its rearward stroke to admit live air to close said valve, an exhaust port leading from the larger portion of the cylinder and also controlled by the head of the piston, and bleed holes leading from the respective ends of the valve chest and each serving to exhaust the air from one end of the chest while the valve is being actuated by live air admitted to the other end.

In testimony, that I claim the foregoing as my own, I have hereto affixed my signature.

GEO. WALTER SMITH.